Patented June 7, 1932

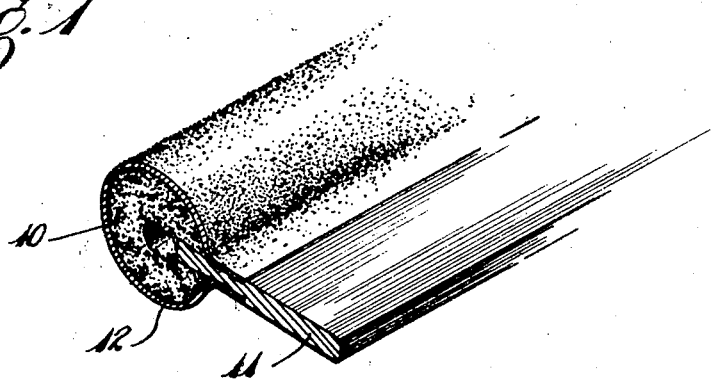
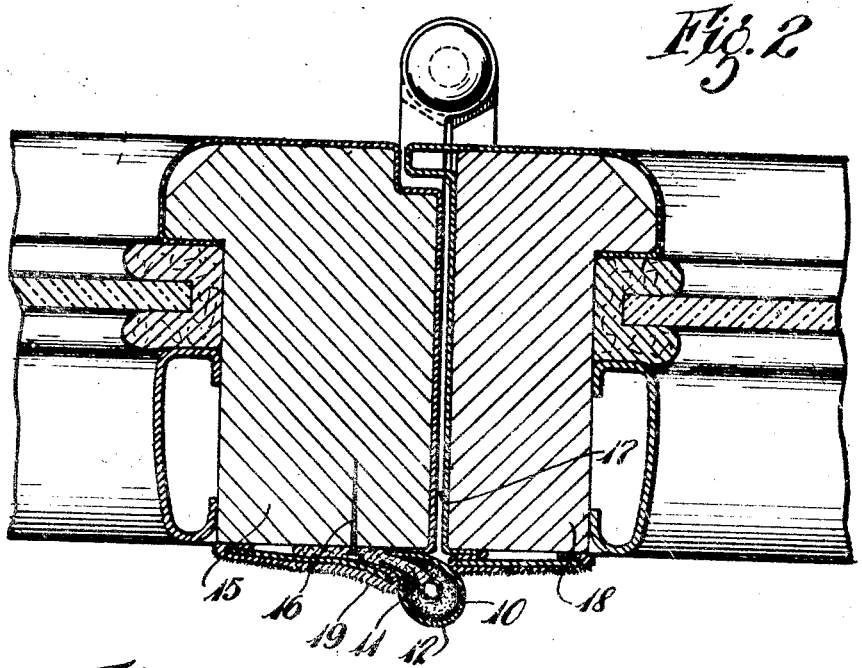
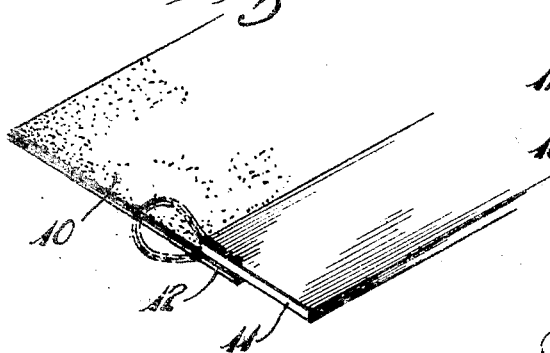
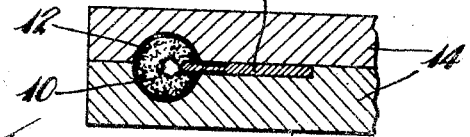

1,861,985

UNITED STATES PATENT OFFICE

WILFRED A. SMITH, OF AKRON, OHIO, ASSIGNOR TO THE B. F. GOODRICH COMPANY, OF NEW YORK, N. Y., A CORPORATION OF NEW YORK

WEATHER STRIP AND METHOD OF MAKING THE SAME

Application filed February 4, 1930. Serial No. 425,800.

This invention relates to weather-strips and to methods of making the same, and more especially it relates to weather-strips such as are used with the upholstery of closed automobile bodies for obscuring the crevices around the doors thereof, and for closing said crevices against the weather.

Heretofore weather-strips of the character mentioned have been made chiefly of rope or rubber tubing, and covered with suitable fabric to match the upholstery of the car, said fabric being so formed and stitched as to provide a radial attaching margin extending longitudinally of the strip, which margin in some cases, is reinforced. Such weather-strips, when new, lie snugly in the desired position, but later are likely to sag and stand away from the underlying crevice which they are designed to close, due to the non-resilient character of the material of their attachment portion.

The chief objects of this invention are to provide a weather-strip for the purpose mentioned, of which the attaching portion will possess inherent resilience; to provide such a weather-strip having a unitary body portion and attaching portion; to provide a weather-strip having a unitary body portion composed of different materials; and to provide an improved method of making weatherstrips.

Of the accompanying drawing:

Fig. 1 is a fragmentary sectional perspective view of my improved weather-strip in its preferred form.

Fig. 2 is a sectional view of the door-jamb of an automobile body, and my improved weather-strip in operative association therewith.

Fig. 3 is a fragmentary perspective view of the component parts of my weather-strip at the initial stage of the assembly thereof.

Fig. 4 is a sectional view of a mold, and a weather-strip therein in the final stage of manufacture.

Referring to Fig. 1 of the drawing, the weather-strip comprises a generally cylindrical body portion 10, a radially disposed attachment portion 11, and an ornamental fabric cover 12 mounted upon said body portion and extending onto said attaching portion. The body portion 10 preferably is tubular to provide economy of material, and preferably is formed of soft cellular rubber. The attaching portion 11 is composed of resilient material such as rubber, which for the sake of economy may be a fibrous rubber composition, and it extends into the body structure 10 and is vulcanized thereto to provide a unitary structure. The cover 12 is vulcanized to the body portion 10 and attaching portion 11, and preferably is flush with latter as shown.

In the manufacture of the weather-strip, the cellular rubber composition in plastic unvulcanized condition is calendered or otherwise applied to one face of a strip of cover-material 12. A marginal portion of a strip of attaching material 11 is then adhered to one marginal portion of the coated cover-strip 12, on the coated side thereof, as is shown in full lines in Fig. 3, and then the opposite marginal portion of the latter is folded over and adhered to the same marginal portion of the attaching strip 11, on the opposite side thereof, as is shown in broken lines in the same figure. The assembled structure is then vulcanized, preferably in a mold 14, as shown in Fig. 4.

For use, the attaching portion 11 of the weather-strip is secured to a door-frame, such as the door-frame 15, Fig. 2, of a closed automobile, by tacks or nails 16, the strip being so positioned that the cylindrical body portion thereof lies upon the crevice 17 between the door-frame 15 and the door 18 of the automobile. Upholstery material 19 obscures the attaching portion 11 in the finished installation.

My improved weather-strip presents a neat appearance, and always will remain in close association with the crevice 17 because of the natural resilience of its component parts. Because the attaching portion 11 extends into the body portion 10 and is vulcanized thereto, to provide a unitary structure, there is little chance of separation of the respective parts, and, furthermore, the cover 12 reinforces the part where most of the hinge action takes place during use, that is, at the juncture of the body portion and attaching portion.

My improved method of manufacture makes for economical production, especially in large quantities, since it is readily adaptable to continuous coating, folding and assembling operations.

Modification may be resorted to without departing from the scope of the appended claims, as I do not limit my claims wholly to the specific construction shown or exact procedure described.

I claim:

1. A weather-strip comprising a generally cylindrical member, a flat resilient member of a different material extending longitudinally thereof and united directly therewith in a unitary structure and an ornamental cover secured to both members.

2. A weather-strip comprising a generally cylindrical member of one grade of rubber, and a flat resilient member of a different grade of rubber extending longitudinally thereof and united therewith to provide a unitary structure.

3. A weather-strip as defined in claim 2 in which the cylindrical member comprises soft cellular rubber.

4. A weather-strip comprising a generally cylindrical member composed of rubber, and a flat, resilient, longitudinally disposed member inset in the wall thereof and extending radially therefrom.

5. A weather-strip comprising a cylindrical body portion of soft cellular rubber, and a radially-disposed, longitudinally extending attaching portion of denser rubber composition vulcanized thereto.

6. A weather-strip comprising a cylindrical body portion of soft cellular rubber, and a radially-disposed, longitudinally extending attaching portion of denser rubber composition inset in said body portion and vulcanized thereto to provide a unitary structure.

7. A weather-strip as defined in claim 6 including a fabric cover vulcanized to said body portion and extending onto said attaching portion.

In witness whereof I have hereunto set my hand this 10th day of January, 1930.

WILFRED A. SMITH.